(12) United States Patent
Jensen

(10) Patent No.: US 8,660,913 B2
(45) Date of Patent: Feb. 25, 2014

(54) REMOTE SERVICING SYSTEM

(75) Inventor: Steven R. Jensen, New Port Richey, FL (US)

(73) Assignee: A Big Blessed Family, LLC, Port Richey, FL (US)

( * ) Notice: Subject to any disclaimer, the term of this patent is extended or adjusted under 35 U.S.C. 154(b) by 513 days.

(21) Appl. No.: 12/638,158

(22) Filed: Dec. 15, 2009

(65) Prior Publication Data

US 2011/0145096 A1 Jun. 16, 2011

(51) Int. Cl.
*G06Q 30/00* (2012.01)

(52) U.S. Cl.
USPC .................................... 705/27.1; 348/14.01

(58) Field of Classification Search
USPC .................. 705/26–27.2; 348/14.01–14.16
See application file for complete search history.

(56) References Cited

U.S. PATENT DOCUMENTS

| | | | | |
|---|---|---|---|---|
| 5,491,791 | A * | 2/1996 | Glowny et al. | 714/37 |
| 5,892,451 | A * | 4/1999 | May et al. | 709/223 |
| 6,144,991 | A * | 11/2000 | England | 709/205 |
| 7,221,377 | B1 * | 5/2007 | Okita et al. | 345/629 |
| 7,379,087 | B2 * | 5/2008 | Yamatari et al. | 348/14.09 |

FOREIGN PATENT DOCUMENTS

| | | | | |
|---|---|---|---|---|
| FR | 2848712 A1 * | 6/2004 | | G09F 27/00 |
| WO | 0128206 A1 | 4/2001 | | |
| WO | WO 01/28206 A1 * | 4/2001 | | H04M 3/00 |

OTHER PUBLICATIONS

Kim, "Collaborative Multimedia Middleware Architecture and Advanced Internet Call Center," Internet Appliance Dept., ETRI/CSTL; Information Networking, 2001, Proceedings 15th International Conference on Jan. 31-2Feb. 2, Piscataway, NJ, USA, IEEE; 2001, IEEE, pp. 246-250.*

IEEE, Collaborative Multimedia Middleware Architecture and Advanced Internet Call Center, by Doo-Hyun Kim et al., Internet Appliance Dept., ETRI/CSTL, 0-7695-0951, Jul. 2001, pp. 246-250.

European Patent Office, International Search Report and Written Opinion of the International Searching Authority, International Application No. PCT/US2010/060464, mailed Feb. 24, 2011 (12 pages).

* cited by examiner

*Primary Examiner* — Adam Levine
(74) *Attorney, Agent, or Firm* — Wood, Herron & Evans, LLP

(57) ABSTRACT

Embodiments of the invention provide methods to manage communication between a local and remote computing system communicating with each other through a network. In some embodiments, a method includes broadcasting a poll across a network to a plurality of remote computing systems in response to user interaction at the local computing system, as well as establishing video conferencing between one of the plurality of remote computing systems and the local computing system in response to the one of the plurality of remote computing systems answering the poll. In alternative embodiments, a method includes automatically establishing video conferencing between a local computing system and a remote computing system in response to receiving a poll from the local computing system, as well as automatically establishing control of at least a portion of the local computing system from the remote computing system.

11 Claims, 4 Drawing Sheets

REMOTE SERVICING SYSTEM

FIELD OF THE INVENTION

The present invention relates generally to interactive computing systems and, more particularly, to a system for enhancing customer interactions as well as enhancing employee efficiency.

BACKGROUND OF THE INVENTION

In the current business environment, it is often times difficult to allocate resources for a business. Typically, a business needs employees for certain days and/or certain times, but cannot afford to hire either full-time or part-time workers. Thus, the customer experience often suffers when customers are not tended to quickly or otherwise required to wait long periods of time to obtain items or services, lowering the goodwill those customers associate with the business. This, in turn, often lowers the number of customers as well as the money made by the business. This issue is compounded when the business includes a plurality of geographically dispersed business locations. In that situation, the owner allocates employees to each location to serve customers. However, on any given day or for any given time, it may be that a particular location has too few employees to deal with customers while, at a different location, there are too many employees such that one or more is idle.

While some customers have begun to turn to online shopping to avoid particular businesses altogether, this still generally includes significant drawbacks. Conventional online shopping is a one-way experience in which customers select their items, enter their billing information, enter their shipping information, and receive a confirmation when they are charged. However, it is often the case that customers have inquiries about a particular item or service. In those situations, the website often does not include the information the customer desires, and there is also often no manner of quickly contacting someone associated with that web site. Typically, the websites offer an e-mail address, but these often go unanswered or include directions to refer to other information in the website that has already been indicated by the customer to be deficient. Thus, customers can be displeased with the service from online retailers, as there is no person-to-person interaction.

Consequently, there is a continuing need for providing flexible, on-demand, person-to-person service to fulfill customer needs.

SUMMARY OF THE INVENTION

Embodiments of the invention address the drawbacks of the prior art and provide methods to manage communication between a local and remote computing system communicating with each other through a network for ordering items and/or services. In some embodiments, the method includes broadcasting a poll across a network from a local computing system to a plurality of remote computing systems in response to user interaction with the local computing system, as well as establishing video conferencing between one of the plurality of remote computing systems and the local computing system in response to the one of the plurality of remote computing systems answering the poll.

In alternative embodiments, another method includes automatically establishing video conferencing between the local computing system and the remote computing system in response to receiving a poll from the local computing system, as well as automatically establishing control of at least a portion of the local computing system from the remote computing system.

Thus, embodiments of the invention provide for a method and system to supply a business with on-demand person-to-person customer interaction. Specifically, embodiments of the invention contemplate a plurality of locations of a business, or a plurality of business, being each configured with customer terminals for customers. In turn, the customer terminals poll a plurality of service terminals, each staffed by an operator, or user, that establish a video conferencing session to serve the customer's needs. In this manner, the customer can inquire about items and/or services, order same, as well as make general inquiries, without tying up otherwise busy employees of the business and/or location, advantageously allowing the service terminal to provide personal service and related functions as if the user of the service terminal were physically at the location of the customer. This may increase the goodwill that customers associate with that business and/or location, which may, in turn, increase the profitability thereof.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Hardware and Software Environment

Figure 1:
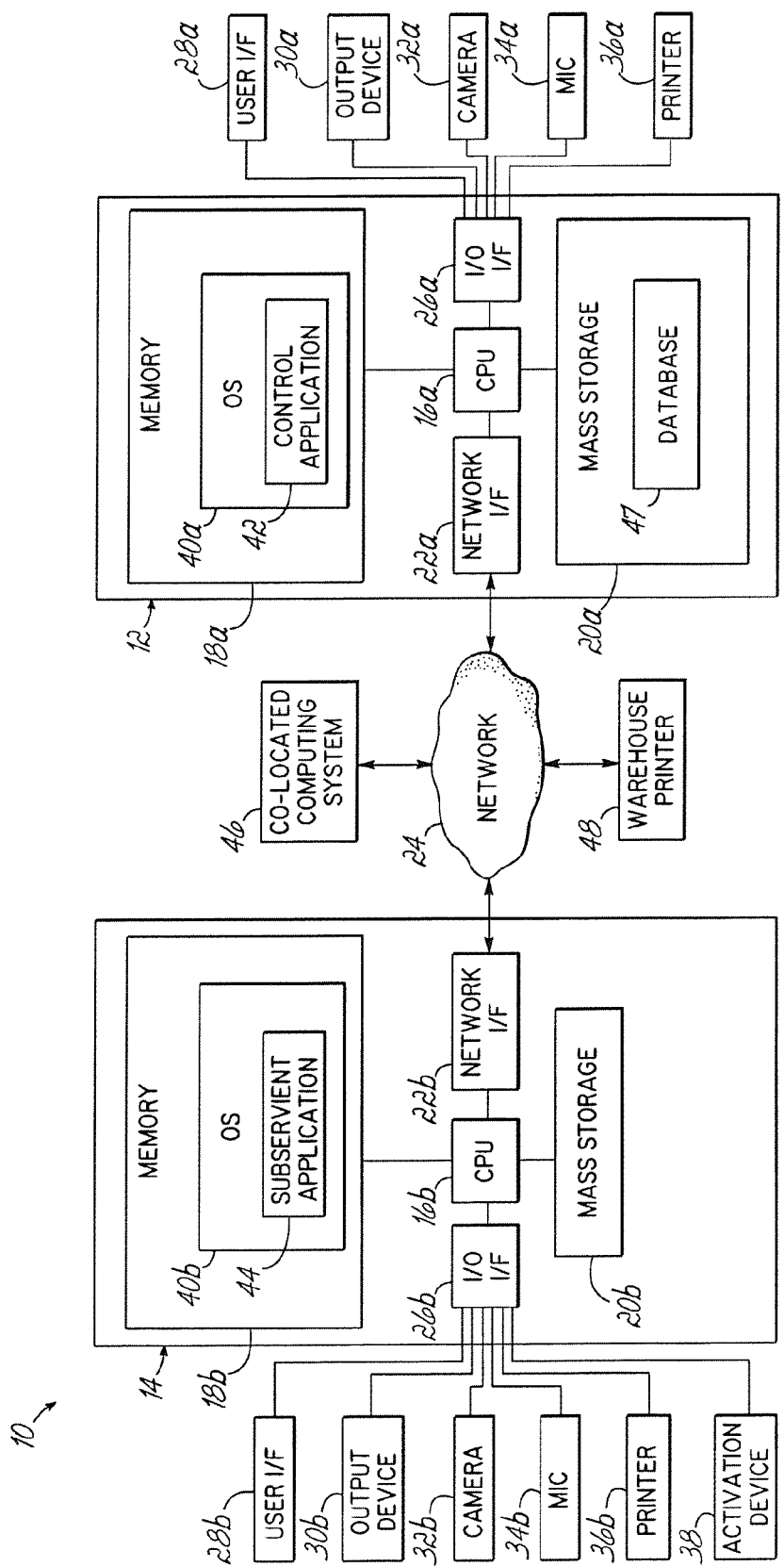
FIG. 1 is a diagrammatic illustration of a virtual representative system consistent with embodiments of the present invention, including a customer terminal and an service terminal communicating with each other through a network.

Turning to the drawings, wherein like numbers denote like parts throughout the several views, FIG. 1 is a diagrammatic illustration of a hardware and software environment for a virtual representative system 10 (hereinafter, "system" 10) consistent with embodiments of the present invention. In particular, and as illustrated in FIG. 1, the system 10 includes at least one service terminal 12 as well as at least one customer terminal 14. In specific embodiments, the system 10 includes a plurality of service terminals 12 and a plurality of customer terminals 14.

Each of the terminals 12 and/or 14, in specific embodiments, is a computer, computing system, computing device, server, disk array, or programmable device such as a multi-user computer, a single-user computer, a handheld computing device, a networked device (including a computer in a cluster configuration), a mobile telecommunications device, a video game console (or other gaming system), etc. Each terminal 12 and/or 14 may be referred to as a "computing system" and/or "computing apparatus," but will be referred to herein as an "service terminal" 12 and a "customer terminal" 14, for use by a user and customer, respectively. Typically, the service terminal 12 is "remote" from the customer terminal 14 in that the service terminal 12 and customer terminal 14 are not configured in the same location, or at least the service terminal 12 is not typically accessible by the customer. In various embodiments of the invention, it will be appreciated that the service terminal 12 and customer terminal 14 being remote includes that they are configured in different areas, such as different rooms, floors of a building, buildings, cities, states, and/or countries, but more generally indicates that they are configured in different locations.

Each terminal 12 and/or 14 includes at least one respective central processing unit ("CPU") 16a and/or 16b coupled to a respective memory 18a and/or 18b. Each CPU 16a and/or 16b is typically implemented in hardware using circuit logic disposed on one or more physical integrated circuit devices or chips. Each CPU 16a and/or 16b may be one or more micro-processors, micro-controllers, field programmable gate arrays, or ASICs, while memory 18a and/or 18b may include random access memory (RAM), dynamic random access memory (DRAM), static random access memory (SRAM), flash memory, and/or another digital storage medium. Each memory 18a and/or 18b is also typically implemented using circuit logic disposed on one or more physical integrated circuit devices, or chips. As such, memory 18a and/or 18b may be considered to include memory storage physically located elsewhere in the respective terminal 12 and/or 14, e.g., any cache memory in the respective CPU 16a and/or 16b, as well as any storage capacity used as a virtual memory, e.g., as stored on a respective mass storage device 20a and/or 20b, as well as stored in another computing system (not shown), a network storage device (e.g., a tape drive) (not shown), or another network device (e.g., such as a server) (not shown) coupled to terminal 12 and/or 14 through at least one respective network interface 22a and/or 22b (each illustrated as, and hereinafter, "network I/F" 22a and/or 22b) by way of at least one network 24. It will be appreciated that the at least one network 24 may include at least one private communications network (e.g., such as an intranet) and/or at least one public communications network (e.g., such as the Internet).

The terminal 12 and/or 14 is coupled to at least one respective peripheral device, or component, through a respective input/output device interface 26a and/or 26U (illustrated as, and hereinafter, "I/O I/F" 26a and/or 26b). In particular, the service terminal 12 is configured to receive data from the user through at least one user interface 28a (including, for example, a keyboard, mouse, scanner, and/or other user interface) and/or output data to the user through at least one output device 30a (including, for example, at least one display, speakers, and/or another output device). The service terminal 12 is further configured to couple with a camera 32a to capture an image and/or video of the user, a microphone 34a to capture speech from the user, and a printer 36a. Similarly, the customer terminal 14 is configured to receive data from the customer through at least one user interface 28b and/or output data to the customer through at least one output device 30b. The customer terminal 14 is further configured to couple with a camera 32b to capture an image and/or video of the customer, a microphone 34b to capture speech from the customer, and a printer 36b. In some embodiments, either of the I/O I/F 26a and/or 26b communicates with a device that is operative as a user interface and output device in combination, such as a touch screen display (not shown). Moreover, in some embodiments, the microphone 34a and/or 34b is configured integrally with its respective camera 32a and/or 32b. As such, each camera 32a and/or 32b and respective microphone 34a and/or 34b may be a combination USB camera/microphone, such as those distributed by Logitech of Freemont, Calif.

As illustrated in FIG. 1, the customer terminal 14 is further coupled to an activation device 38. In response to a customer selectively activating the activation device 38, the customer terminal 14 may poll the network 24 to connect with at least one service terminal 12 consistent with embodiments of the present invention. The activation device 38 may include a button that customers can push, a pressure sensitive mat that a customer walks on when approaching the customer terminal 14, a motion sensing device triggered by the customer, a sound sensing device triggered by the customer, and/or another triggering device that can be triggered by a local or remote user in response to detecting the presence of a customer at the customer terminal 14. In specific embodiments, the activation device 38 is a Griffin PowerMate™ USB Multimedia Controller as distributed by Griffin Technology of Nashville, Tenn.

In alternative embodiments, the customer terminal 14 initiates communication with the service terminal 12 in response to the customer interacting with the user interface 28b of the customer terminal 14, and in particular in response to clicking a mouse of the user interface 28b, interacting with a graphical user interface displayed on the output device 30b using the user interface 28b, in response to detecting a specific voice command from the customer, and/or another triggering action detected by the customer terminal 14. In some embodiments, the customer terminal 14 is configured with additional peripherals to accept data associated with the customer, such as a scanner, a bar code reader, a magnetic stripe reader (e.g., for ID badges and/or credit cards), a currency detector/collector (e.g., a device in which the customer can input currency, such as bills or coins, to pay for an order, and which indicates the currency input as well as provides change to the customer, when necessary), a personal identification number keypad (e.g., when the user interface 28b does not a keyboard), a finger print scanner, a signature capture device, and/or another data input device that may be used to enter data.

Each of the terminals 12 and/or 14 is typically under the control of a respective operating system 40a and/or 40b and executes or otherwise relies upon various computer software applications, sequences of operations, components, programs, files, objects, modules, etc., consistent with embodiments of the invention. In some embodiments, the service terminal 12 executes or otherwise relies on a control application 42 to control communication with the customer terminal 14, as well as control at least a portion of the customer terminal 14, consistent with embodiments of the invention. In some embodiments, the customer terminal 14 executes or otherwise relies on a subservient application 44 to initiate communication with the service terminal 12 as well as transfer control of at least a portion of the customer terminal 14 to the service terminal 12 consistent with embodiments of the invention. As such, and in specific embodiments, the control application 42 can be considered to be a "client" application that is configured to control the operation of the subservient application 44, or "host" application, as commonly referred to for applications used in remote administration. The control application 42 and subservient application 44 are configured to communicate video and/or audio data therebetween, with the control application 42 configured to control at least a portion of the customer terminal 14 through the subservient application 44 (for example, control the customer terminal 14 to display video of a user at the service terminal 12, control the customer terminal 14 to capture video of a customer and sound from the customer at the customer terminal 14, control the customer terminal 14 to print a document, control the customer terminal 14 to prevent the customer from interacting with at least a portion of the user interface thereof, etc). In specific embodiments, the control application 42 and/or subservient application 44 include corresponding portions of remote desktop control software, such as that distributed by LogMeIn, Inc., of Woburn, Mass. and/or such as Virtual Network Computing ("VNC"), an open source remote desktop control software.

In some embodiments, the system 10 includes a computing system co-located with the customer terminal 14 (referred to herein as a "co-located computing system" 46). The co-located computing system 46 may be configured with a subservient application 44 similar to the customer terminal 14. As such, the service terminal 12 may be configured to control at least a portion of that co-located computing system 46 in addition to, and/or instead of, the customer terminal 14. For example, the co-located computing system 46 may include a computing system configured to operate as a point-of-sale system, or a computing system for a cashier. The service terminal 12 may thus control at least a portion of the co-located computing system 46 to fulfill a customer's order.

In some embodiments, the service terminal 12 is configured with a database 47 to store data about users, customers, orders, items, stock, and/or other data that may be used consistent with embodiments of the invention. Furthermore, in some embodiments the system 10 includes a warehouse printer 48 that is coupled to the network 22. As such, the service terminal 12 is configured to communicate with the warehouse printer 48 to print off a ticket associated with an order at a warehouse (not shown). In this manner, a picker may refer to the ticket printed by the warehouse printer 48 to pick the item out of the warehouse to subsequently provide to the customer. In various embodiments, the warehouse printer 48 can be coupled to a warehouse terminal (not shown), the warehouse printer 48 can be connected to the service terminal 12 in addition, or as a replacement, to printer 36a, or the warehouse printer 48 can be coupled to the co-located computing system 46.

Figure 2:
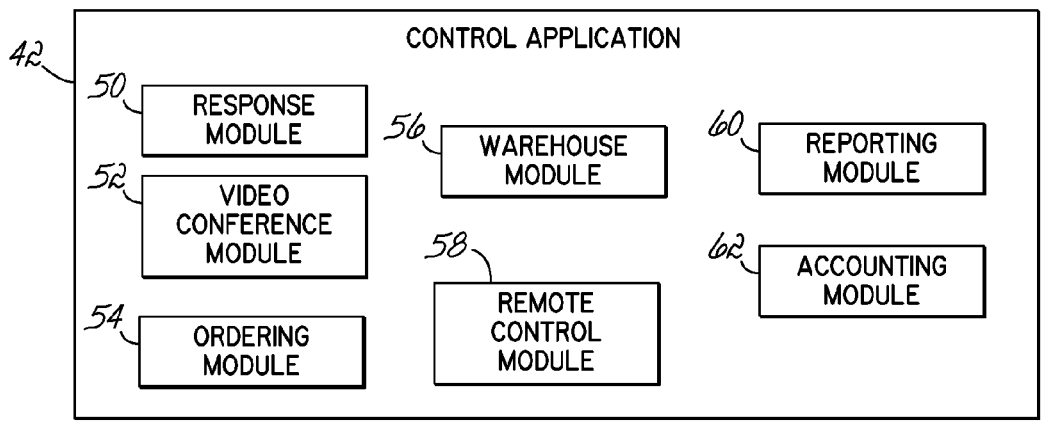
FIG. 2 is a diagrammatic illustration of a control application of the service terminal of FIG. 1.

FIG. 2 is a diagrammatic illustration of a plurality of applications, sequences of operations, components, programs, files, objects, modules, etc. (each of which is referred to as a "module" for simplicity), that may be included in the service terminal 12, and in particular the control application 42, of FIG. 1. Specifically, FIG. 2 illustrates that the control application 42 may include a response module 50, a video conferencing module 52, an ordering module 54, a warehouse module 56, a remote control module 58, a reporting module 60, and/or an accounting module 62. In some embodiments, the response module 50 is configured to alert a user to a request from the subservient application 44 for communication, while the video conferencing module 52 is configured to establish a video and audio link between the service terminal 12 and the customer terminal 14. In specific embodiments, at least a portion of the video conference module 52 may include video conferencing program code such as VID™ as distributed by Logitech of Freemont, Calif.

The ordering module 54, on the other hand, is configured to provide an interface for the user of the service terminal 12 to place an order for an item, either from in stock items or from a third party, as well as account for charges associated therewith. As such the ordering module 54 may be configured to generate an ordering interface (not shown) in which the user may enter order information. In some embodiments, the warehouse module 56 is configured to provide an interface for the user of the service terminal 12 to view all the items currently in stock, and in particular all the items currently in stock at all locations of a particular business. As such, the warehouse module 56 may be configured to generate a warehouse interface (not shown) in which the user may view stock information, as well as other information, such as indications of replacement parts for an item. The remote control module 58 is configured to control at least a portion of the customer terminal 14. For example, the remote control module 58 is configured to allow the user terminal 12 to control the use of at least a portion of a graphical user interface of the customer terminal 14 (e.g., the service terminal 12 is configured to control a graphical user interface, or "screens," displayed by the customer terminal 14, as well as potentially lock out the customer of the customer terminal 14 controlling that graphical user interface), as well as the use of components or other peripherals coupled to the customer terminal 14, including the camera 32b, microphone 32, and/or printer 36b coupled to the customer terminal 14. The reporting module 60 is configured to allow the user to create reports associated with the utilization of the system 10. For example, the reporting module may be used to count the number of times the customer terminal 14 is activated by customers, count the number of times a particular customer terminal 14 connects with an service terminal 12, count the number of times customer terminals 14 associated with a particular business connect with service terminals 12, indicate the user that answers the most requests from the customer terminal 14, and/or other metrics that may be associated with utilization of the system 10. The accounting module 62 is configured to determine a charge associated with the use of the system 10.

Figure 3:
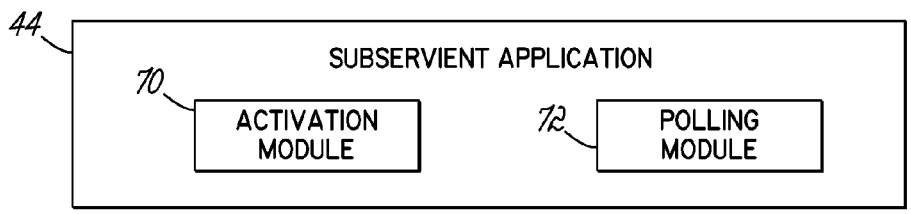
FIG. 3 is a diagrammatic illustration of a subservient application of the customer terminal of FIG. 1.

FIG. 3 is a diagrammatic illustration of a plurality of applications, sequences of operations, components, programs, files, objects, modules, etc. (each of which is referred to as a "module" for simplicity), that may be included in the customer terminal 14, and in particular the subservient application 44, of FIG. 1. Specifically, FIG. 3 illustrates that the control application 42 may include an interaction module 70 and a polling module 72. In some embodiments, the interaction module 70 is configured to determine when a customer interacts with the activation device 38 or user interfaces 28b of the customer terminal 14 to create a connection with the service terminal 12, while the polling module 72 is configured to broadcast a poll to the network 24 for service terminals 12.

The poll, in some embodiments, is a request for a service terminal 12 to connect to the customer terminal 14.

Figure 4:
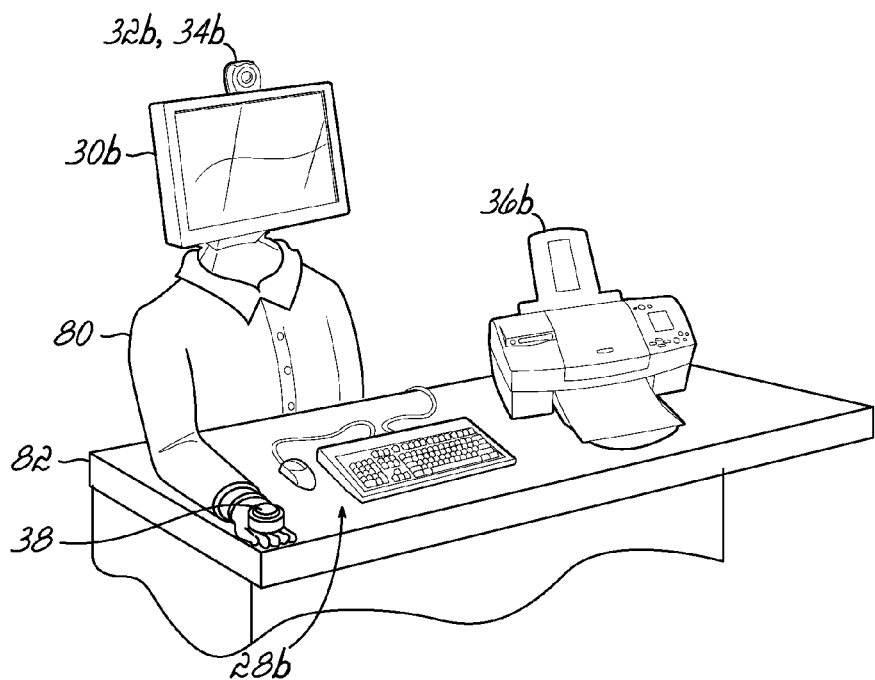
FIG. 4 is a diagrammatic illustration of an exemplary setup for the customer terminal of FIG. 1.

In some embodiments, it may be desired to configure the customer terminal 14 in such a manner as to provide an aesthetically pleasing experience. As such, FIG. 4 is a diagrammatic illustration of a virtual representative 80 that may be used consistent with embodiments of the invention. As illustrated, the output device 30b, the camera 32b, and the microphone 34b coupled with the customer terminal 14 are mounted on the virtual representative 80, which is a model, mannequin, and/or other form that is humanoid in appearance. In particular, the output device 30b, the camera 32b, and the microphone 34b are mounted where the head of the humanoid form would normally be. Additionally, the activation device 38 is mounted on the virtual representative 80, and particularly in the hand of the humanoid form. The virtual representative 80 may be configured proximate to a counter 82 for the customer to use at least one user interface 28b of the customer terminal 14 (e.g., the illustrated mouse and/or keyboard) as well as receive tickets printed from the printer 36b of the customer terminal 14.

A person having ordinary skill in the art will recognize that the environments illustrated in FIGS. 1-4 are not intended to limit the scope of embodiments of the invention. In particular, the service terminal 12 and/or customer terminal 14 may include more or fewer components and/or peripherals consistent with alternative embodiments of the invention. Indeed, a person having skill in the art will recognize that other alternative hardware and/or software environments may be used without departing from the scope of the invention. For example, the control application 42 and/or subservient application 44 may be configured with fewer or additional modules. Additionally, a person having ordinary skill in the art will appreciate that the service terminal 12 and/or customer terminal 14 may include more or fewer applications disposed therein, and that in some embodiments the modules of the Control application 42 and/or subservient application 44 may be configured as stand-alone applications on the respective service terminal 12 and/or customer terminal 14. Still furthermore, one having ordinary skill will appreciate that the peripherals shown coupled to the customer terminal 14 may be instead coupled, through the network 24 and/or through the I/O I/F 26a, to the service terminal 12 rather than through the I/O I/F 26b of the customer terminal 14. As such, other alternative hardware and software environments may be used without departing from the scope of embodiments of the invention.

Moreover, a person having ordinary skill in the art will recognize that the environment illustrated in FIG. 4 is also not intended to limit the scope of embodiments of the invention. For example, in some embodiments there is no virtual representative 80 and the output device 30b is merely situated on the counter 82. Alternatively, the virtual representative 80 may take on an appearance related to an industry with which the system 10 is related. For example, if the system 10 is being used by a business associated with plumbing, HVAC, or other similar services, the virtual representative 80 may be a PVC pipe man. Also for example, if the system 10 is being used by a business associated with automobiles, the virtual representative 80 may be an auto parts robot. As such, the virtual representative 80 may be used to emulate a theme for a business that uses the system 10.

The routines executed to implement the embodiments of the invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system and/or terminal, and that, when read and executed by one or more processors thereof, cause that computing system and/or terminal to perform the steps necessary to execute steps, elements, and/or blocks embodying the various aspects of the invention.

While embodiments of the invention have and hereinafter will be described in the context of fully functioning computing systems, those skilled in the art will appreciate that the various embodiments of the invention are capable of being distributed as a program product in a variety of for ins, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Software Description and Flows

Figure 5:
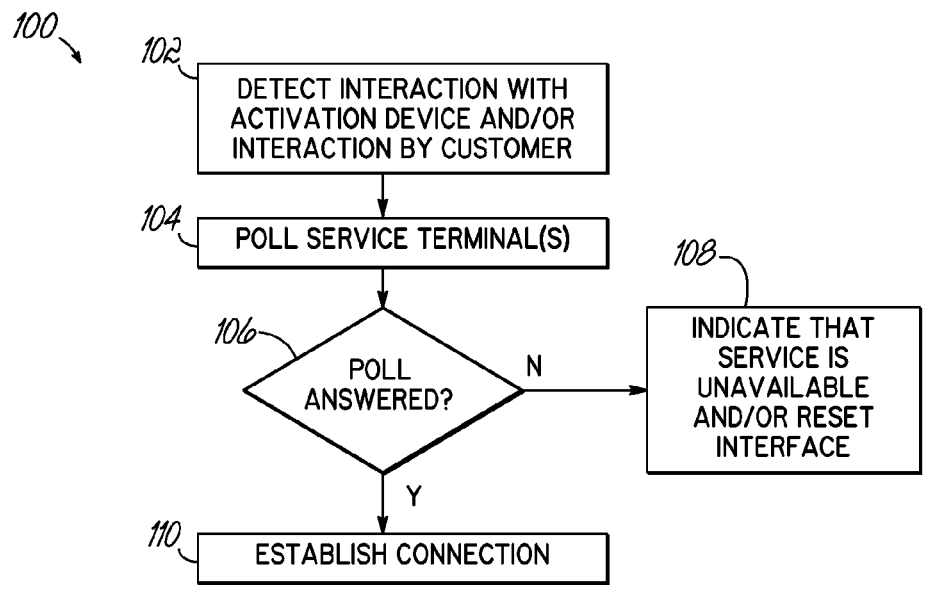
FIG. 5 is a flowchart illustrating a sequence of operations executable by the customer terminal of FIG. 1 to poll the service terminal of FIG. 1.

In some embodiments, a customer interacts with a customer terminal to establish a connection with a user of a user terminal to order an item, make a query about an item, or otherwise inquire about items, services, or additional information. FIG. 5 is a flowchart 100 illustrating a sequence of operations to poll at least one service terminal consistent with embodiments of the invention. Specifically, the sequence of operations of FIG. 5 may be embodied in program code configured on a customer terminal consistent with embodiments of the invention. Thus, the program code determines that there has been interaction with an activation device of the customer terminal or customer interaction with the customer terminal to activate same (block 102) and, in response, the program code polls at least one service terminal for that service terminal to answer (block 104). In particular, the program code may be configured to poll certain service terminals. As such, the poll may specify the service terminals for which a particular poll is associated, as well as an order in which to poll a plurality of service terminals. In this manlier, a first service terminal may ignore a poll, then forward that poll to a second service terminal as specified by a list. Alternatively, the poll may be broadcast on a broadband basis to all service terminals associated with a specific customer terminal (e.g., a subset of a plurality of service terminals). When the poll is not answered by at least one service terminal (e.g., after a certain period of time, the program code determines that the poll has not been answered) ("No" branch of decision block 106) it is indicated that service is unavailable and/or the interface for the customer terminal is reset (block 108). When the poll is answered by at least one service terminal ("Yes" branch of decision block 106) the customer terminal establishes a connection with that at least one service terminal (block 110).

Figure 6:
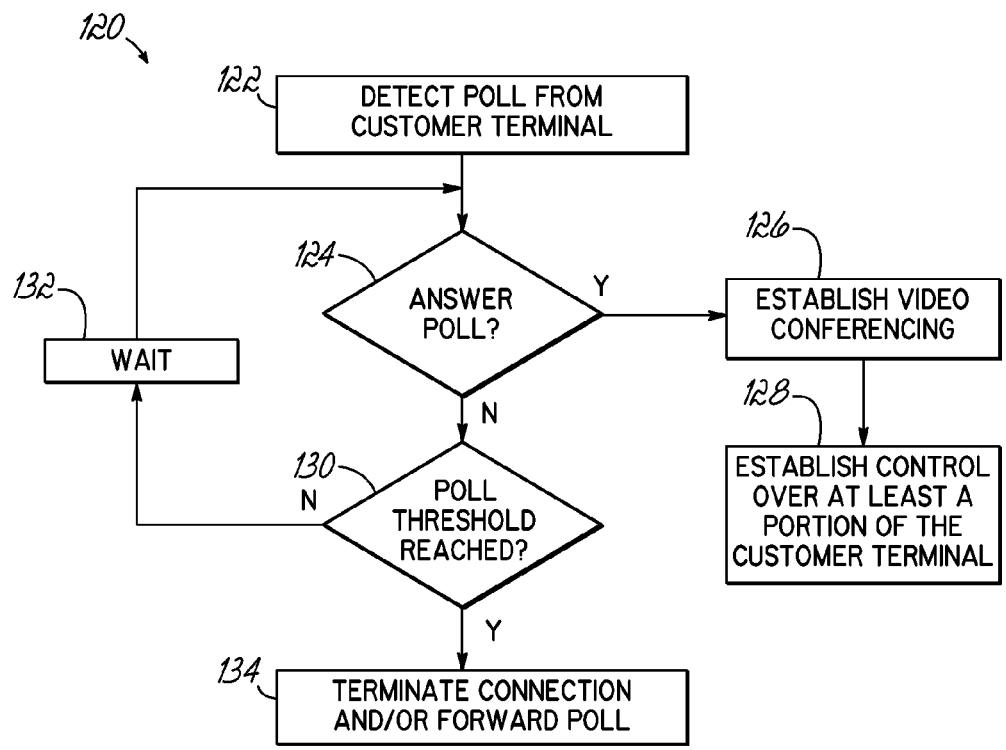
FIG. 6 is a flowchart illustrating a sequence of operations executable by the service terminal of FIG. 1 to answer a poll and establish video conferencing with the customer terminal of FIG. 1.

In response to a poll, a service terminal typically establishes a video conferencing connection between the customer terminal that broadcast the poll and the service terminal. FIG. 6 is a flowchart 120 illustrating a sequence of operations to establish a connection between a customer terminal and an service terminal consistent with embodiments of the invention. Specifically, the sequence of operations of FIG. 6 may be embodied in program code configured on a service terminal consistent with embodiments of the invention. Thus, the program code detects a poll from a customer terminal (block 122) and determines whether to answer the poll (block 124). In particular, the program code may determine whether to answer a poll in response to user interaction with the program code to answer a particular poll. Thus, when the program code determines that the user has selected to answer the poll ("Yes" branch of decision block 124) the program code establishes video conferencing between the service terminal and the customer terminal that initiated the poll (block 126) and establishes control over at least a portion of the customer terminal (block 128). In particular, the service terminal can establish control over at least one peripheral of the customer terminal (e.g., its camera, printer, magnetic stripe reader) and/or over the operation of the customer terminal (e.g., its graphical user interface). When the program code determines that a user has not selected to answer the poll, such as from inaction from the user to answer the poll ("No" branch of decision block 124), the program code determines whether a poll threshold has been reached (block 130). In particular, a poll may be broadcast to a particular service terminal for from about 5 to about 30 seconds. After that, the service terminal may ignore the poll and/or forward the poll to another service terminal. Thus, when the poll threshold has not been reached ("No" branch of decision block 130) the program code waits for a few seconds (block 132) then again determines whether the use has selected to answer the poll (block 124). When the poll threshold has been reached ("Yes" branch of decision block 130) the program code terminates any connection with the customer terminal that initiated the poll and/or forwards the poll to another service terminal (block 134). It will be appreciated that, in some embodiments, the user can actively deny to answer the poll at block 124. As such, the sequence of operations of FIG. 6, in those embodiments, may proceed directly to block 134 from block 124 when the user actively denies to answer a poll.

Figure 7:
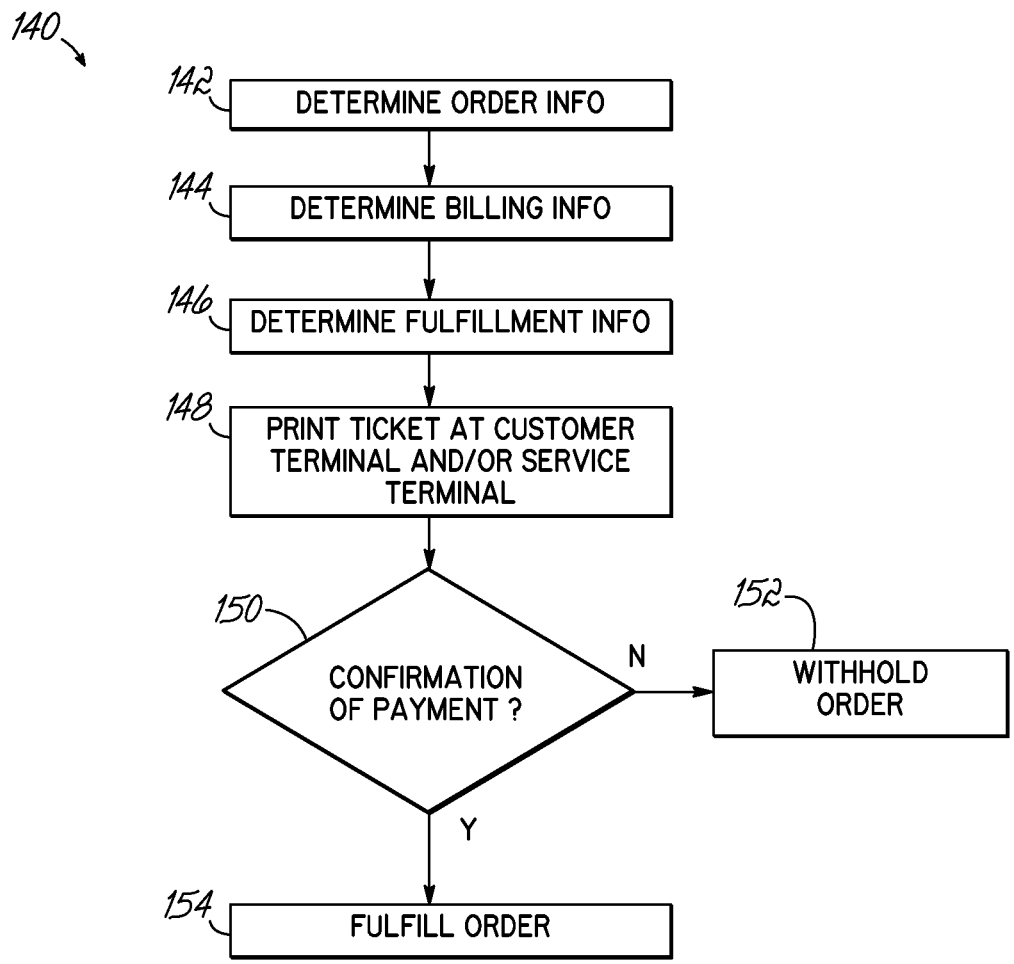
FIG. 7 is a flowchart illustrating a sequence of operations executable by the service terminal of FIG. 1 to place an order.

In response to establishing a video conference between a customer and user, the customer can interact with an actual person (e.g., the user, who may be a service provider for a business and/or location thereof). The user, in turn, may be responsible for answering the customer's inquiries, ordering an item or service for the customer, completing a transaction for the customer, or otherwise assisting the customer. As such, the user can order items or services for the customer, check inventory in stock at a plurality of geographically dispersed locations, contact suppliers, and/or otherwise assist the user. FIG. 7 is a flowchart illustrating a sequence of operations to complete an order of a customer consistent with embodiments of the invention. Specifically, the sequence of operations of FIG. 7 may be embodied in program code configured on the service terminal consistent with embodiments of the invention. Specifically, and in some embodiments, the program code determines order information from data input by the customer and/or user at the respective customer terminal and/or user terminal (block 142). In some embodiments, the program code provides an order interface for the customer and/or the user to enter information about an item or service requested by the customer. For example, the order information may be a part or item that the customer wants to order. The program code, in two optional steps, further determines billing information associated with the customer (block 144) as well as fulfillment information associated with the customer (block 146). For example, the billing information may be entered by the customer through a magnetic stripe reader coupled to the customer terminal, or the billing information may be determined from data input by the customer and/or user at the respective customer terminal and/or user terminal. The fulfillment information, on the other hand, may include shipping information, such as an address associated with the customer, an address associated with the location for the customer terminal, or an address associated with a particular location of the business that utilizes the virtual representative system. Alternatively, the fulfillment information may include loading information, such as when the item does not need to be shipped and, rather, is to be loaded onto a customer conveyance at a loading dock.

In response to determining the order, billing, and/or fulfillment information (blocks 142, 144, and/or 146, respectively), the user may print a ticket for the customer at the customer terminal, as well as print a confirmation ticket at the service terminal (block 148). The ticket can be provided to a cashier by the customer, which then charges the customer based upon a price indicated in the ticket. Alternatively, the ticket can be provided to the customer to hand to an order picker to select at least one item for the customer. Further alternatively, the ticket can be printed on a printer separate from that coupled with the customer terminal or the service terminal, such as a printer at a warehouse that can be referred to by an order picker to fulfill the order. Alternatively, the ticket can be provided to the customer as a receipt for their purchase, which is in turn completed by the service terminal. In some embodiments, an order is not fulfilled until a continuation of payment associated with that order is received. As such, and in an optional step, the program code determines whether a confirmation of payment has been received (block 150). When the order is charged by the user at the service terminal, the confirmation of payment may be received directly by the service terminal. Similarly, when the order is paid for by a customer at the customer terminal (such as through the customer entering credit information through a user interface or a magnetic stripe reader, or through the customer entering money through a currency detector/collector), the confirmation of payment may be sent from the customer terminal to the service terminal, which may in turn determine whether the payment has been made in full and instruct the currency detector/collector to provide change, if necessary. However, when the order is paid for by the customer at a cash register, the confirmation of payment may be generated by the cash register, which may then be provided to the service terminal. Thus, when confirmation of payment is not received ("No" branch of decision block 150) the order is withheld (e.g., the order is not completed) (block 152). However, when the confirmation of payment is received ("Yes" branch of decision block 150) the order is fulfilled (block 154).

Typically, embodiments of the virtual representative assistant system are used for a customer to order an item or service, or to satisfy an inquiry. For example, a customer may come in to order a part. Initially, the customer establishes a connection with a user and requests the part. The user, in turn, utilizes the system to order the part. In particular, the user may use an ordering interface to enter order information (e.g., part, billing, and/or fulfillment information) and/or use a warehouse interface to view information about apart (e.g., whether it's present in stock in the store at which the customer is contacting the user from, whether it's in stock at a particular location, and/or whether it's available to be ordered). The user may then print a ticket for the customer to take to a cashier to pay for the part at the location of the customer, or the user may charge the customer immediately and print the ticket for the customer as a receipt. In that latter scenario, the part may be sent to an address associated with the customer, the location of the customer terminal from which the customer ordered the part, or another location from which the user may pick up the part. Alternatively, the customer may come in to order a replacement part. As such, the customer may have a particular part with them when they interact with the user. The user, in turn, may control the peripherals of the customer terminal to discover information about the part. For example, the user may control the camera of the customer terminal to zoom in on the part and/or take a picture of the part. The user may then utilize the warehouse interface to determine whether the part is available or has been replaced by a newer part, as well as contact a manufacturer or distributor with information about the part and/or the picture of the part to get more information about the part, get more information about alternative parts, and/or order the part.

In some embodiments, a user at a service terminal is responsible for interacting with a number of customer terminals. The customer terminals, in turn, may each be associated with one business, or a first portion of the customer terminals may be associated with a first business while a second portion of the customer terminals may be associated with a second business. In this manner, a plurality of geographically dispersed locations for one or more business can be served, or have their service augmented, by that user. For example, a business may have a plurality of geographically dispersed locations. Each location may include at least one employee and a customer terminal. In this way, customers can make detailed inquiries using the customer terminals, as well as place orders therefrom, and utilize the employee for checkout or more simple inquiries. Thus, manpower at one or more of the plurality of geographically dispersed locations associated with that business can be increased to deal with surges in demand without resorting to more costly full-time or part-time hiring.

In some embodiments, the service terminal is further configured to determine the utilization of a virtual representative system. For example, the service terminal may be configured to run reports about the number of customers that use customer terminals, the number of uses of customer terminals during a time period (e.g., a month), the number of orders fulfilled by customers using customer terminals, the number of customers served by a user of a service terminal, the number of locations serviced by a user of an service terminal, an amount of time that customers video conference with users, and/or other utilization information that a business may wish to know. Also in some embodiments, the service terminal is configured to charge an entity associated with particular customer terminals, such as a business in which the customer terminals are configured and/or a person who owns that business, for use of the virtual representative system. For example, the service terminal may be configured to charge a business based upon a discrete charge for each connection of a customer terminal to an service terminal, a discrete charge for each order, a percentage of the total of each order, a charge based on the amount of time that a user provides a customer service, and/or based upon additional systems.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, a person having ordinary skill in the art will appreciate that any of the blocks of the above flowcharts may be deleted, augmented, made to be simultaneous with another, combined, or be otherwise altered in accordance with the principles of the embodiments of the invention. Accordingly, departures may be made from such details without departing from the spirit or scope of Applicant's general inventive concept.

Other modifications will be apparent to a person having ordinary skill in the art. Therefore, the invention lies in the claims hereinafter appended.

What is claimed is:

1. A method of providing service to a customer with a remote service system by establishing communication between one of a plurality of remote computing systems and a local computing system through a network, comprising:
   in response to a customer interacting with the local computing system proximate a location of the local computing system, generating a poll from the local computing system;
   broadcasting the poll across the network to the plurality of remote computing systems from the local computing system; and
   in response to one of the plurality of remote computing systems answering the poll, establishing video conferencing between the one of the plurality of remote computing systems and the local computing system.

2. The method of claim 1, wherein broadcasting the poll across the network comprises:
   broadcasting the poll on a broadband basis to the plurality of remote computing systems.

3. The method of claim 1, wherein the poll is broadcasted to a first remote computing system of the plurality of remote computing systems, and wherein the poll is forwarded from the first remote computing system to the one of the plurality of remote computing systems in response to the first remote computing system refusing to answer the poll.

4. The method of claim 1, wherein the poll is broadcasted to a first remote computing system of the plurality of remote computing systems, and wherein the poll is forwarded from the first remote computing system to the one of the plurality of remote computing systems in response to the first remote computing system failing to answer the poll.

5. The method of claim 1, further comprising:
   establishing control of the local computing system from the one of the plurality of remote computing systems in response to the one of the plurality of remote computing systems answering the poll.

6. The method of claim 1, wherein an actuation device is coupled to the local computing system, and wherein the customer interaction is customer interaction with the actuation device.

7. The method of claim 6, wherein the actuation device is a button.

8. The method of claim 1, wherein a user interface is coupled to the local computing system, and wherein the customer interaction is customer interaction with the user interface.

9. The method of claim 1, wherein an output device is coupled to the local computing system, and wherein the output device is mounted on a humanoid form.

10. The method of claim 9, wherein a component is coupled to the local computing system, wherein the customer interaction is customer interaction with the component, and wherein the component is mounted on a hand of the humanoid form.

11. An apparatus, comprising:
 at least one processing unit;
 a network interface coupled to a network; and
 a memory containing program code, the program code configured to, when executed by the at least one processing unit:
 generate a poll from the apparatus in response to a customer interacting with the apparatus proximate a location of the apparatus;
 broadcast the poll across the network to a plurality of remote computing systems from the apparatus; and
 establish video conferencing between one of the plurality of remote computing systems and the apparatus in response to the one of the plurality of remote computing systems answering the poll.

* * * * *